United States Patent Office 3,817,700
Patented June 18, 1974

3,817,700
PROCESS FOR TREATING ACRYLIC FIBERS TO OBTAIN CARBONIZABLE AND GRAPHITIZABLE SUBSTRATES
Virginia C. Menikheim, Chapel Hill, N.C., assignor to Monsanto Company, St. Louis, Mo.
No Drawing. Continuation-in-part of abandoned application Ser. No. 72,223, Sept. 14, 1970. This application Apr. 13, 1972, Ser. No. 243,840
Int. Cl. D06c 7/04; C01b 31/07
U.S. Cl. 8—115.5       8 Claims

ABSTRACT OF THE DISCLOSURE

A process is provided for producing a heat-stabilized char or substrate from acrylic fibers which can be converted into high quality carbon or graphite fibers. The fibers are first treated in a polyol solution containing a basic nitrile polymerization catalyst followed by an air-oxidation at temperatures of 270° C. and above. The pre-oxidation treatment drastically reduces the time normally required for effecting the necessary oxidation. The carbonizable or graphitizable substrates obtained yield carbon and graphite fibers of improved properties.

CROSS REFERENCE TO RELATED APPLICATIONS

This application is a continuation-in-part of my copendinng application Ser. No. 72,223, filed Sept. 14, 1970 now abandoned.

BACKGROUND OF THE INVENTION

Field of the invention

This invention is directed to a method for converting acrylic fibers into a substrate which will withstand the severe temperature conditions needed to produce carbon or graphite fibers therefrom. Precursor fibers of organic origin cannot be subjected to graphitization temperatures which range from 2500° C. to 2900° C., or for that matter the 1000° C. to 1600° C. level required in carbonization, without first being rendered thermally stable. This invention provides a means for conveniently effecting such stabilization for acrylic fiber precursors.

Because of their great tensile strength and modulus (stiffness), carbon and graphite fibers are finding increasing application as reinforcing elements in structural materials, and particularly in the reinforced resins used in the fabrication of various parts of high-performance aircraft. Consequently, improvements in their quality and economics of their manufacture are continuously being sought.

Description of the prior art

It is known that fibers derived from acrylonitrile containing polymers can be transformed into high quality carbon and graphite fibers. Heretofore, this precursor fiber has been conditioned for carbonization and/or graphitization by a process involving an air-oxidation without a previous treatment. Because untreated acrylic fibers in a gaseous medium cannot withstand temperatures above 240° C., necessarily the reaction temperatures cannot be permitted to exceed this level during the initial stages of oxidation. As a result, a processing time of at least 7 hours and often as much as 24 hours is needed to obtain a sufficient degrgee of oxidation. Furthermore, the process is not readily controllable to yield a carbonizable substrate of the desired internal structure for obtaining carbon and graphite fibers of superior tensile and modulus properties.

SUMMARY OF THE INVENTION

Accordingly, it is an object of this invention to provide an efficient method for the production of heat stable, carbonizable and graphitizable substrates from acrylic precursor fibers.

Another object of the invention is to provide a method which greatly reduces the time required for achieving heat stabilization of fibers derived from acrylic polymers.

An additional object is the provision of a method for the production of a heat stable, carbonizable and graphitizable substrate from an acrylic fiber precursor, which substrate has a preferred structure for subsequent conversion to a very high strength and high modulus carbon or graphite yarn.

The method of the invention broadly considered comprises first treating the acrylic fiber precursor in a heated polyol solution which contains a catalytic amount of an alkaline or alkaline earth metal salt of a polyol. The pretreated fibers are then exposed while under tension to an oxygen containing atmosphere at a temperature of from 270° C. to 350° C.

DESCRIPTION OF THE INVENTION

In the context of this invention the term "acrylic polymer" refers to copolymers and terpolymers of polyacrylonitrile as well as the homopolymer. That is, those polymers are included which are obtained by polymerizing acrylonitrile with monomers such as vinyl acetate, methyl acrylate and others which are known by those skilled in the art to be polymerizable with acrcylonitrile to give satisfactory fibers. The processes used in the production of such polymers, and their conversion into fibers are well known by those skilled in the art.

Although the term "fiber" is predominately used herein, the terms "yarn" and "tow" should be considered interchangeable therewith. That is, fiber in the form of yarn or tow or a single filament are equally applicable in the method hereinafter described.

The process is carried out in two distinct stages or steps which for convenience may be designated the pre-oxidation and the oxidation steps. As a consequence of the first or pre-oxidation treatment, the oxidation phase can be carried out much more rapidly than would otherwise be possible at temperatures in excess of 270° C. without thermal damage to the fiber.

The pre-oxidation step involves a treating solution consisting of minor or catalytic amounts of an alkaline or alkaline earth metal substituted polyol in a polyol solvent. The term "polyol," as used herein, includes those aliphatic polyhydric alcohols which are water-soluble, contain two or more hydroxyl groups, and have a boiling point above 165° C. The boiling point is important only to the extent that it must exceed the reaction temperature employed during the bath treatment. The polyol may be saturated or unsaturated and contain carbon chains which are either straight or branched. By way of example only, suitable polyols incluude glycerol; diglycerol; ethylene glycol; diethylene glycol; triethylene glycol; propylene glycol; 1,4-butanediol; 2-methyl-2,4-pentanediol; 2-ethyl-1,3-hexanediol and 2,3-dimethyl-2,3-butanediol.

The alkali or alkaline earth metal salt may be derived from any one or a mixture of the afore-described class of polyols. That is, one or more of the hydroxyl groups present in the particular polyol used is substituted by an alkali or alkaline earth metal; e.g., sodium, potassium, or calcium. The salt component can but need not be a derivative of the same polyol employed as the solvent in the treating solution.

Although the metal salt may be preformed and placed in solution, a convenient method for obtaining the same is to form it in situ. That is, an appropriate quantity of the metal in the form of its methylate or hydroxide is merely added to the heated polyol to be used as the solvent vehicle in the treating solution. The metal hydroxide or methylate will react with the polyol to yield the metal salt thereof with the methanol or water formed as by-products boiling off at the operating conditions employed during the bath treatment.

Since the metal-substituted polyol has a catalytic function in the process, as will be later described, it is present in the treating solution in what is known to the art as a catalytic amount. Although subject to variation depending upon conditions, it has been found that concentrations in the range of from about 0.005 to about 0.150 milliequivalents per gram of solution are generally satisfactory with from about 0.02 to 0.06 milliequivalents being often of preference. The term "milliequivalents per gram" is defined in the art as one thousandth the quantity of base that will provide one gram-ionic weight of the polyol ion if the salt were completely ionized.

In conducting the pre-oxidation treatment the fibers are immersed in a bath containing the afore-described treating solution. The bath temperature is maintained in the range of from about 165° C. to 210° C. with from about 185° C. to 200° C. being usually of preference. The fiber exposure time to the bath is usually for a period of from about 1–15 minutes, with from about 1–5 minutes being generally preferred.

Although the application of tension to the fiber during the course of treatment in the bath is not a critical requirement, it may be used to advantage in that it tends to favor the modulus property of the ultimate graphite fiber. When employing tension, at least enough is required to prevent the occurrence of shrinking. It has been found that a tension of 50 to 60 grams is generally sufficient to maintain constant length when employing yarns in the 1800 to 2000 denier range.

During the course of treatment the metal salt in the solution reacts with the polymer of the fiber to provide initiation sites for subsequent polymerization of the nitrile groups. This subsequent polymerization then forms a thermally resistant "ladder" polymer.

The mechanism by which the initiation sites are introduced into the polymer can best be described by specific example using a preferred treating soluiton for illustration, i.e., sodium glyceroxide in glycerol. During treatment, the fiber is caused to swell by the glycerol present in the bath, thus permitting the sodium glyceroxide to diffuse throughout the polymer regime. The sodium cation catalyzes addition of the anionic segment of the salt to some of the nitrile groups of the polymer to form imine esters in accordance with the following equation wherein the ionized sodium salt is represented as A+B−:

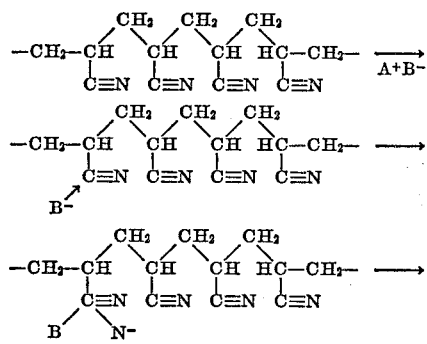

The presence of the anionic sites can initiate nitrile polymerization instantly or at a later stage. However, it is important that polymerization be limited until the subsequent oxidation step. This is accomplished by using the mildest conditions possible during the bath treatment to establish sufficient polymerization sites. The possible reason for this is that premature polymerization restricts the mobility of the polymer molecule so as to impair the degree of orientation realizable by stretching the fiber during oxidation.

When untreated acrylic fibers are subjected to differential thermal analysis (DTA), the scans show a large exotherm starting between about 200° C. to 230° C., depending upon polymer compoistion, and peaking at about 260° C. to 340° C. Since this exotherm is believed to be associated with nitrile polymerization, it provides a tool for monitoring the adequacy of polymer modification and a guide for any necessary adjustment in pre-oxidation treating conditions.

The temperature at which the triggered exotherm attains its peak ($\Delta T$) is believed to be influenced by the ability of the nitrile groups to react. Polymerization initiators shift the position of the exotherm peak to a lower temperature. Changes in the actual height of the peak, as opposed to the temperature of its occurrence, are believed to be related to the number of nitrile groups able to react or in the ability of the nitrile groups to react rapidly.

Acrylic fibers, which are adequately modified in their polymer structure by the pre-oxidation treatment, give DTA scans with the exothermal peak positions occurring at temperatures from about 15° C. to 60° C. below that of the untreated fiber control.

The actual height of the peak ($\Delta T$) for properly treated fibers should not be appreciably lower than that of the untreated fiber. Substantially lower peak heights indicate premature cyclization and polymerization resulting from pre-oxidation conditions that are too severe or overly prolonged.

Following treatment in the bath, the fiber is water-washed to effect removal of unbound polyol and metal ions. If the treated fiber is to be stored for a period of time before further processing, it is advisable that it be dried after washing. When operating continuously, a drying step may be used to advantage, but it is not an essential requirement.

In carrying out the second phase or oxidation step of the process, the pre-treated acrylic yarns are heated under tension in air or other oxygen containing atmosphere to a temperature in the range of from about 270° C. to about 350° C. The residence time will generally be from about 45 minutes to 3 hours depending upon the temperatures employed and the degree of fiber modification achieved in the pre-treatment.

It is desirable that the fiber be brought to the 270° C. temperature level within 30 minutes and preferably in about 10 minutes. An exposure to intermedaite temperatures for too long usually results in excessive reaction before the fiber attains the plastic state. When this occurs the fiber extensibility becomes impaired. Once the fiber has been exposed to the 270° C. level and stretched, the temperatures of the remaining air-bake period can be varied in the 270° C. to 350° C. range.

The application of longitudinal tension during oxidation of "air-bake" will substantially increase the strength and modulus of the eventual carbon or graphite fibers produced. As a minimum, sufficient tension should be employed to prevent shrinkage, with elongations up to 15 percent and beyond being preferred.

The process of this invention may be conducted either in a batchwise manner or continuously. The resulting product may be carbonized to produce carbon yarns by conventional procedures. Alternatively, the treated yarns can be converted directly to graphite yarns having extraordinary strength and modulus. Graphitization of the directly graphitizable substrates can be realized by heating the thermally-stable substrate to between 2500° C. and 2900° C. in an inert atmosphere while applying longitudinal tension.

Since the yarns processed in accordance with this invention are dimensionally stable at very high temperatures in addition to being fireproof, they may also be used in the fabrication of fireproof, articles, such as clothing, tenting and coverings of various types.

DESCRIPTION OF THE PREFERRED EMBODIMENTS

Example 1

This example illustrates the heat-stabilization of yarn derived from a polyacrylonitrile homopolymer.

A sample of polyacrylonitrile yarn containing filaments of about 1.5 denier per filament was passed under a tension of 5.0 to 5.5 ounces through a solution of sodium glyceroxide in glycerol at a temperature 195° C. The amount of sodium salt present in the solution was 0.02 milliequivalents per gram of solution. Following a 4 minute sojourn in the solution, the yarn was water washed and then dried. The treated yarn was thereafter heated in air over a temperature gradient such that the yarn temperature was brought from room temperature to 270° C. in less than 15 minutes. Heating was continued at a temperature ranging between 270° C. and 312° C. for a period of 2 hours and 15 minutes. During heating in air the sample was elongated 18 percent.

The heat-stabilized fiber obtained was graphitized under the following conditions in an inert atmosphere:

Temperature (C °) _____ 2700
Tension (grams/filament) _____ 450–500
Residence time (minutes) _____ 1

The resulting graphite fibers had the following properties:

Density (grams/cm.$^3$) _____ 1.89
Cross-section (10$^{-4}$ cm.) _____ 2.71
Tensile strength (k.s.i.) _____ 383
Modulus-sonic (m.s.i.) _____ 62

Example II

This example illustrates the heat-stabilization of a continuous filament yarn derived from an acrylonitrile-vinyl acetate copolymer (AN/VA92/7). The graphite fibers produced therefrom had extraordinarily high tensile and modulus properties.

A sample of the above-noted yarn was passed under 90 grams tension through a solution of sodium glyceroxide in glycerol. The solution contained 0.015 milliequivalents per gram of solution of the sodium salt, and was at a temperature of 195° C. During a residence time of 4 minutes in the bath, the yarn was elongated 7 percent by stretching. Following treatment in the solution, the yarn was washed in water and then dried. Thereafter, the yarn was heated in air over a temperature gradient such that a temperature of 270° C. was reached in 20 minutes. Heating was then continued for 115 minutes with the temperature varying between 270° C. and 310° C. The yarn was elongated 16 percent during the heating in air.

The heat-stabilized fiber obtained was graphitized in an inert atmosphere at the following conditions:

Temperature (C °) _____ 2700
Tension (grams/filament) _____ 600
Residence time (minutes) _____ 1

The graphite fibers obtained had the following properties:

Density (grams/cm.$^3$) _____ 1.85
Cross-section (10$^{-4}$ cm.) _____ 2.83
Tensile strength (k.s.i.) _____ 440
Modulus-sonic (m.s.i.) _____ 64

Example III

This example illustrates that the polyol employed in the treating solution is amendable to variation. The solution consisted of sodium glycolate in ethylene glycol with the sodium salt being present in the amount of 0.05 milliequivalents per gram of solution.

A sample of yarn derived from a copolymer of acrylonitrile and vinyl acetate (AN/VA–93/7), was immersed in the afore-mentioned solution for a period of 4 minutes with the solution temperature at 180° C. During treatment sufficient tension was applied on the yarn bundle to maintain constant length. After washing and drying, the yarn was heated in air between 310° C. and 340° C. for 135 minutes. The resulting graphitizable substrate was converted to graphite fiber under the following conditions:

Temperature (C °) _____ 2450
Tension (grams/filament) _____ 1
Residence time (minutes) _____ 600

The graphite fibers obtained had the following properties:

Density (grams/cm.$^3$) _____ 1.65
Cross-section (10$^{-4}$ cm.) _____ 6.07
Tensile strength (k.s.i.) _____ 252
Modulus-sonic (m.s.i.) _____ 49.7

Example IV

This example illustrates that by the method of this invention acrylic polymer fibers can be converted to a graphitizable substrate in less than an hour of process time.

A yarn derived from an acrylonitrile-vinyl acetate copolymer was passed continuously under a tension of 120 grams through a solution of sodium glyceroxide in glycerol at 195° C. The amount of sodium salt present in the solution was 0.02 milliequivalents per gallon of solution. During a 4 minute exposure to the testing solution, the yarn was elongated 8 percent. After washing and drying, the yarn was heated in air to a temperature ranging between 270° C. and 315° C. for a period of 45 minutes with the temperature being brought to the 270° C. level in 7 minutes. While being heated in air, the yarn was stretched 16 percent. The resulting graphitizable substrate was converted to graphite fiber under the following conditions:

Temperature (C °) _____ 2700
Tension (grams/filament) _____ 600
Residence time (minutes) _____ 1

The graphite fibers obtained had the following properties:

Density (grams/cm.$^3$) _____ 1.85
Cross-section (10$^{-4}$ cm.) _____ 3.01
Tensile strength (k.s.i.) _____ 391
Modulus-sonic (m.s.i.) _____ 64

Example V

This example illustrates the applicability of calcium glyceroxide in the treating solution employed in the pre-oxidation step of the process.

A yarn derived from an acrylonitrile-vinyl acetate copolymer was passed through a solution of calcium glyceroxide in glycerol at 197° C. with an exposure time of 4 minutes. The solution contained 0.03 milliequivalents per gram of the calcium salt. After washing and drying, a different thermal analysis scan was taken on a sample of the tested fiber and the exotherm peaked at 285° C. which was 40° C. below that of an untreated fiber control. This indicated that the polymeric fiber had been sufficiently modified by the incorporation of nitrile polymerization sites for carrying out an effective and expeditious air oxidation.

The treated yarn was then heated in air at 275° C. for 135 minutes. The resulting yarn product was free of fusion, and nonflammable in a Meker Burner flame. It was fully capable of being graphitized directly to produce high strength, high modulus graphite fiber.

I claim:
1. A process for producing a carbonizable and graphitizable substrate from fibers derived from polymers of acrylonitrile which comprises:
  (1) introducing said fibers into a treating bath maintained at a temperature in the range of about 165° C. to 210° C. and containing a solution of an aliphatic polyol and a catalytic amount of an alkali metal or alkaline earth metal salt of said polyol, said polyol being soluble in water and having a boiling point in excess of 165° C.; permitting said fibers to remain in said treating bath for a period of from about 1 to 15 minutes, after which said fibers are water washed, and thereafter;
  (2) heating said fibers under tension in an oxygen containing atmosphere at a temperature in the range of from about 270° C. to 350° C. for a period of from about 45 minutes to 3 hours.
2. The process in accordance with claim 1, wherein said alkali metal or alkaline earth metal salt is present in an amount of from 0.005 to 0.150 milliequivalents per gram of said solution.
3. The process in accordance with claim 1, wherein the aliphatic polyol is glycerol.
4. The process in accordance with claim 1, wherein the aliphatic polyol is ethylene glycol.
5. The process in accordance with claim 1, wherein the aliphatic polyol is glycerol and the metal salt is sodium glyceroxide.
6. The process in accordance with claim 1, wherein in step (2) said fibers are brought to a temperature of 270° C. in less than 30 minutes.
7. The process in accordance with claim 1, wherein said fibers are maintained under tension while in said treating bath.
8. A process for producing a carbonizable and graphitizable substrate from fibers derived from polymers of acrylonitrile which comprises:
  (1) introducing said fibers under tension into a treating bath maintained at a temperature of from about 185° C. to 200° C., and wherein said bath contains a solution of sodium glyceroxide in glycerol, the sodium glyceroxide being present in an amount of from about 0.02 to 0.06 milliequivalents per gram of solution; permitting said fibers to remain in said treating bath for a period of from about 2 to 10 minutes followed by a water wash, and thereafter;
  (2) heating said fibers under tension in an oxygen containing atmosphere at a temperature between 270° C. and 310° C. for from 45 minutes to 3 hours.

References Cited
UNITED STATES PATENTS

| | | | |
|---|---|---|---|
| 3,403,008 | 9/1968 | Hamling | 23—209.1 F |
| 2,812,230 | 11/1957 | Evans | 8—173 |

OTHER REFERENCES

W. G. Vosburgh, Textile Research Journal, vol. 30, November 1960, pp. 882–896.

MAYER WEINBLATT, Primary Examiner

T. J. HERBERT, Jr., Assistant Examiner

U.S. Cl. X.R.

423—447